(12) United States Patent
Pedersen et al.

(10) Patent No.: US 9,354,737 B2
(45) Date of Patent: May 31, 2016

(54) ACTIVE STYLUS SELF-CAPACITANCE MEASUREMENT

(75) Inventors: Trond Jarle Pedersen, Trondheim (NO); Vemund Kval Bakken, Menlo Park, CA (US)

(73) Assignee: Atmel Corporation, San Jose, CA (US)

(*) Notice: Subject to any disclaimer, the term of this patent is extended or adjusted under 35 U.S.C. 154(b) by 296 days.

(21) Appl. No.: 13/571,016

(22) Filed: Aug. 9, 2012

(65) Prior Publication Data

US 2014/0043279 A1    Feb. 13, 2014

(51) Int. Cl.
*G06F 3/041* (2006.01)
*G06F 3/0354* (2013.01)
*G06F 3/044* (2006.01)

(52) U.S. Cl.
CPC .......... *G06F 3/0416* (2013.01); *G06F 3/03545* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 4,686,332 A * | 8/1987 | Greanias et al. | 345/173 |
| 5,790,106 A * | 8/1998 | Hirano et al. | 345/173 |
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,094,133 B2 * | 1/2012 | Sato et al. | 345/173 |
| 8,179,381 B2 | 5/2012 | Frey | |
| 2009/0251434 A1 * | 10/2009 | Rimon et al. | 345/173 |
| 2009/0315854 A1 | 12/2009 | Matsuo | |
| 2010/0066693 A1 * | 3/2010 | Sato et al. | 345/173 |
| 2011/0122087 A1 * | 5/2011 | Jang et al. | 345/174 |
| 2011/0193776 A1 * | 8/2011 | Oda et al. | 345/157 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0021291 A1 * | 1/2013 | Kremin et al. | 345/174 |

(Continued)

FOREIGN PATENT DOCUMENTS

WO    WO 2012/129247    9/2012

OTHER PUBLICATIONS

U.S. Appl. No. 61/454,936, filed Mar. 21, 2011, Myers.

(Continued)

*Primary Examiner* — David D Davis
(74) *Attorney, Agent, or Firm* — Baker Botts L.L.P.

(57) ABSTRACT

In one embodiment, a method includes modifying an amount of charge of a capacitance of a touch sensor. The modified amount of charge results in a voltage at the capacitance being a first pre-determined voltage level. The method also includes applying a first pre-determined amount of charge to the capacitance. The application of the first pre-determined amount of charge to the capacitance modifies the voltage at the capacitance from the first pre-determined voltage level to a first charging voltage level. The method also includes determining a first voltage at a sampling capacitor. The first voltage is proportional to a difference between the first charging voltage level and a reference voltage level. The method also includes determining whether a touch and stylus input to the touch sensor has occurred based on the first voltage and a second voltage.

20 Claims, 8 Drawing Sheets

(56) References Cited

U.S. PATENT DOCUMENTS

2013/0207939 A1* 8/2013 Kremin et al. ............... 345/179
2014/0152582 A1* 6/2014 Agarwal et al. ............. 345/173

OTHER PUBLICATIONS

U.S. Appl. No. 61/454,950, filed Mar. 21, 2011, Lynch.
U.S. Appl. No. 61/454,894, filed Mar. 21, 2011, Rothkopf.

* cited by examiner

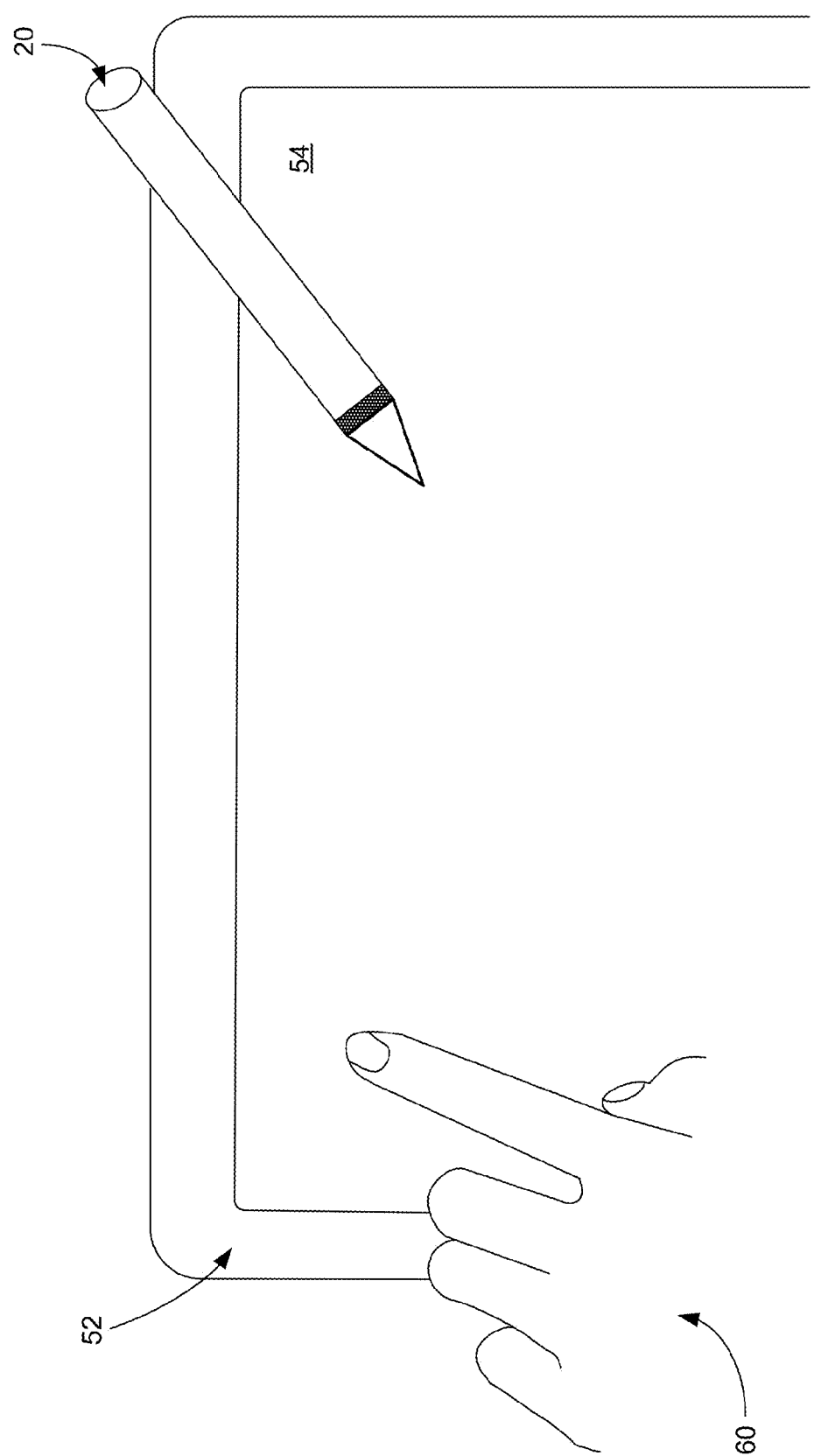

ACTIVE STYLUS SELF-CAPACITANCE MEASUREMENT

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

BRIEF DESCRIPTION OF THE DRAWINGS

FIG. 3 illustrates an example combination input to an example device.

DESCRIPTION OF EXAMPLE EMBODIMENTS

Figure 1:
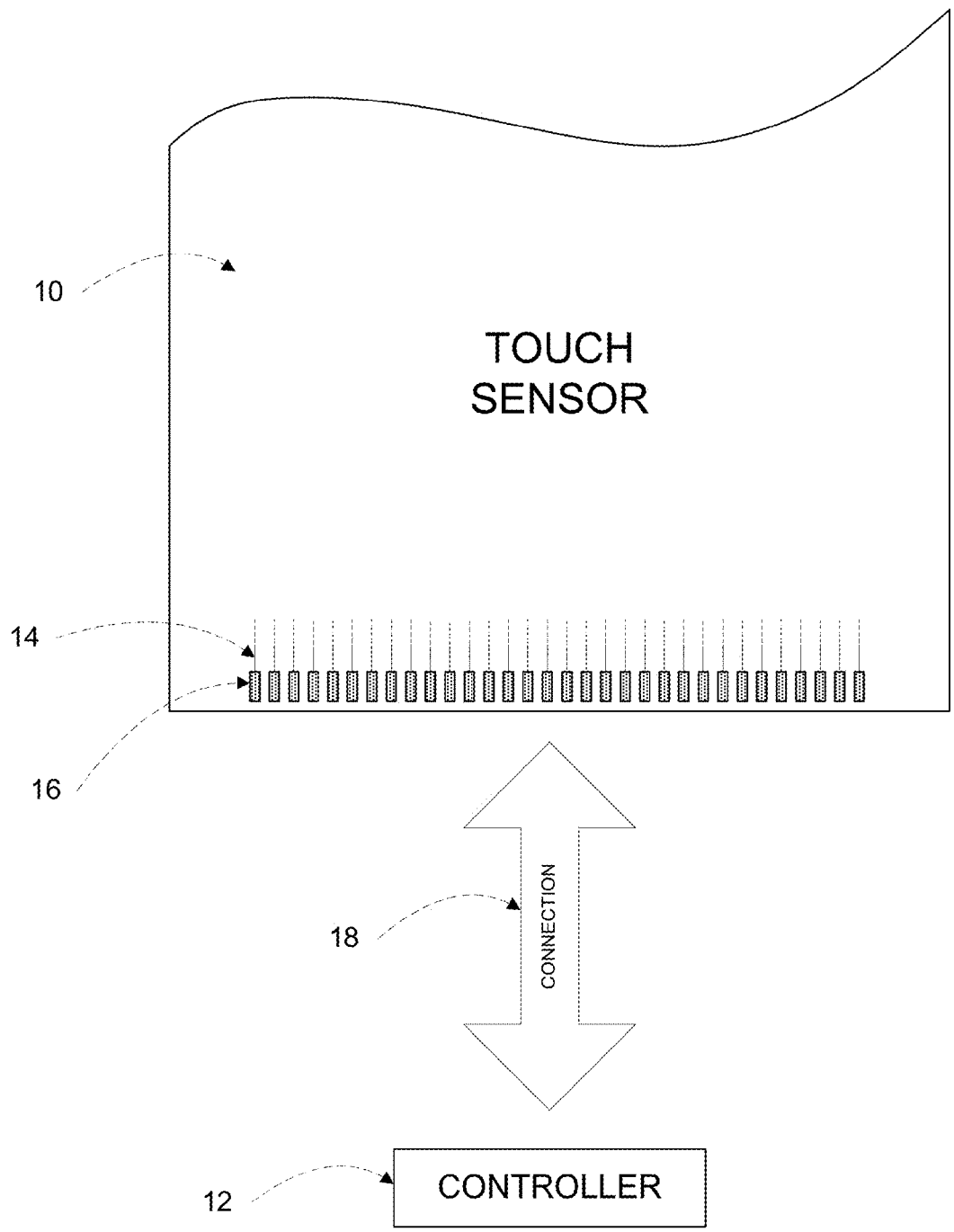
FIG. 1 illustrates an example touch sensor with an example controller.

FIG. 1 illustrates an example touch sensor with an example touch-sensor controller. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
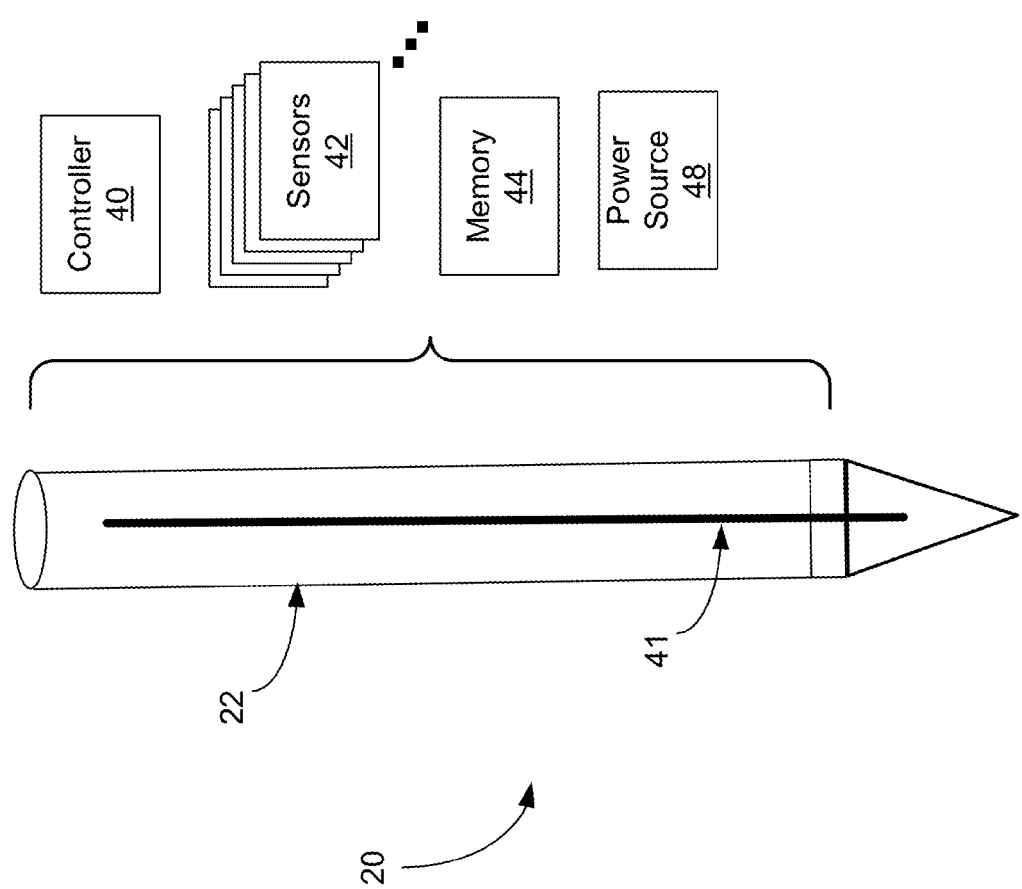
FIG. 2 illustrates example components of an example active stylus.

FIG. 2 illustrates example components of an example active stylus. Active stylus 20 includes one or more components, such as a controller 50, sensors 42, memory 44, or power source 48. In particular embodiments, one or more components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. As another example, active stylus 20 may communicate via any applicable short distance, low energy data transmission or modulation link, such as, for example and without limitation, via a radio frequency (RF) communication link. In this case, active stylus 20 includes a RF device for transmitting data over the RF link.

Controller 50 may be a microcontroller or any other type of processor suitable for controlling the operation of active stylus 20. Controller 50 may be one or more ICs—such as, for example, general-purpose microprocessors, microcontrollers, PLDs, PLAs, or ASICs. Controller 50 may include a processor unit, a drive unit, a sense unit, and a storage unit. The drive unit may supply signals to electrodes of tip 26 through center shaft 41. The drive unit may also supply signals to control or drive sensors 42 or one or more external components of active stylus 20. In particular embodiments, the drive unit of active stylus 20 is configured to continuously transmit a signal that may be detected by electrodes of the touch sensor. As an example and not by way of limitation, the drive unit of active stylus 20 may include a voltage pump, an oscillator, or a switch, such that the voltage pump may generate a high voltage signal, the oscillator may generate a waveform such as a square wave or a sine wave, or the switch may toggle the potential of tip 26 between zero voltage and a maximum voltage. The drive unit of active stylus 20 may transmit a signal, such as a square wave or sine wave, that may be sensed by the electrodes.

The sense unit may sense signals received by electrodes of tip 26 through center shaft 41 and provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, active stylus 20 may include one or more sensors 42, such as touch sensors, gyroscopes, accelerometers, contact sensors, or any other type of sensor that detect or measure data about the environment in which active stylus 20 operates. Sensors 42 may detect and measure one or more characteristic of active stylus 20, such as acceleration or movement, orientation, contact, pressure on outer body 22, force on tip 26, vibration, or any other suitable characteristic of active stylus 20. As an example and not by way of limitation, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may be charged by energy from a user or device. As an example and not by way of limitation, power source 48 may be a rechargeable battery that may be charged by motion induced on active stylus 20. In other particular embodiments, power source 48 of active stylus 20 may provide power to or receive power from the device or other external power source. As an example and not by way of limitation, power may be inductively transferred between power source 48 and a power source of the device or another external power source, such as a wireless power transmitter. Power source may also be powered by a wired connection through an applicable port coupled to a suitable power source.

FIG. 3 illustrates an example combination input to an example device. A touch or proximity input may be provided to device 52 using active stylus 20, a portion of human hand 60 within a touch-sensitive area 54 of the touch sensor of device 52, or a combination thereof. In the example of FIG. 3, the portion of human hand 60 interacting with touch-sensitive area 54 is a finger. In particular embodiments, the portion of human hand 60 may include one or more fingers. The signal communicated to the controller of the touch sensor results from interaction of one or more fingers of human hand 60 and active stylus 20 with touch-sensitive area 54.

The controller of the touch sensor of device 52 differentiates between active stylus 20 interactions and interactions with the portion of human hand 60, as described below. In particular embodiments, substantially all the electrodes (i.e. drive and sense) of the touch sensor of device 52 may be sensed to detect the signal from active stylus 20 without applying a drive signal. In particular embodiments, touch-sensor controller communicates signals corresponding to interactions such as for example touch interactions from stylus 20 or finger touch to a processor of device 52. Although this disclosure describes particular methods of differentiating between active stylus interaction and human hand interaction within the touch-sensitive area, this disclosure contemplates any suitable method to differentiate between interactions of the active stylus and interactions of the human hand within the touch-sensitive area.

In particular embodiments, the controller of the touch sensor associates a detected combination of interaction of the portion of human hand 60 with touch-sensitive area 54 and interaction of active stylus 20 with touch-sensitive area 54 with a pre-determined function executed by device 52. Moreover, the controller may determine whether interaction of the portion of the human hand 60 with touch-sensitive area 54 forms a gesture in conjunction with the interaction of active stylus 20 or forms a gesture separate from the interaction of active stylus 20 with touch-sensitive area 54. As an example and not by way of limitation, substantially simultaneous interaction of one finger of human hand 60 and active stylus 20 with touch-sensitive area 54 may be associated with a pre-determined function. Moreover, substantially simultaneous interaction of one finger and active stylus 20 with touch-sensitive area 54 may jointly initiate the pre-determined function, such as for example zooming in, zooming out, or rotation of an object displayed on the display of device 52. As another example, interaction of two fingers of human hand 60 and active stylus 20 with touch-sensitive area 54 may be associated with two or more pre-determined functions of device 52. In particular embodiments, interactions of two fingers of human hand 60 with touch-sensitive area 54 may be used in a "spread" gesture to expand a text area displayed on the display of device 52 and interaction of active stylus 20 with touch-sensitive area 54 may be used by the user to handwrite an input in the expanded text area. Although this disclosure describes detecting and processing the combination input from the active stylus interaction with the touch-sensitive area and human hand interaction with the touch-sensitive area occurring within the controller of the touch sensor, this disclosure contemplates use of any suitable controller or combination of controllers to detect and process the combination input from the active stylus interaction with the touch-sensitive area and human hand interaction with the touch-sensitive area.

The touch sensor of device 52 may be configured with two modes of operation, labeled for convenience purposes only as "master" mode and "slave" mode. The "master" mode refers to a mode of operation in which the touch sensor of device 52 transmits signals to electrodes and senses a change in capacitance. In some embodiments, the change in capacitance in "master" mode may be caused by the presence of a finger or by the presence of active stylus 20, which performs operations in reaction to the transmitted signals. The "slave" mode refers to a mode of operation in which the touch sensor periodically scans for signals transmitted by active stylus 20 and then performs operations in response to received the signals from active stylus 20.

In particular embodiments, to determine the location of an object, such as for example active stylus 20 or a portion of human hand 60 of the user, within touch-sensitive area 54, a scan of the electrodes of the touch sensor may be performed (e.g., driving and scanning the capacitive nodes of the touch sensor). In particular embodiments, the touch sensor operation may be adjusted to interleave self-capacitance and "slave" mode measurements to detect both touch and proximity input from human hand 60 and an active stylus 20 input during the same measurement cycle. As an example and not by way of limitation, a measurement cycle including one or more of pulses is transmitted by the touch sensor and one or more of signal samples corresponding to a touch or active stylus input are read by scanning the capacitive nodes. The samples may be digitally quantized (e.g., via an analog-to-digital converter (ADC)).

Figure 4A:
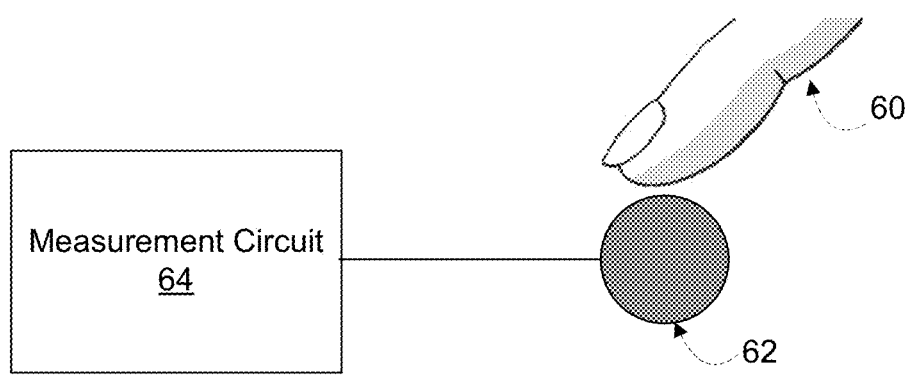
FIGS. 4A-C illustrate schematics for example measurements with an example touch sensor.
Figure 4B:
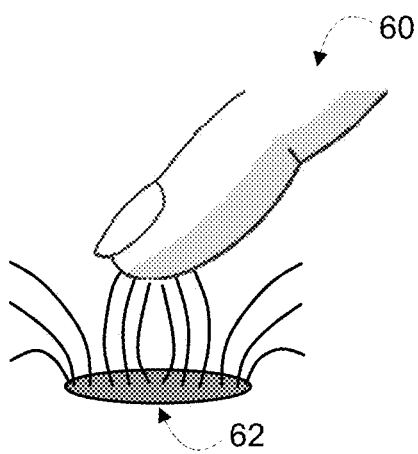
Figure 4C:
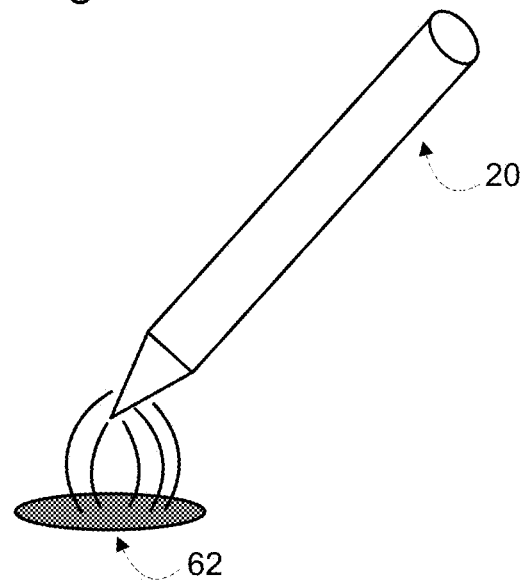

FIGS. 4A-C illustrate schematics for example measurements with an example touch sensor. In the example of FIG. 4A, an electrode 62 of the touch sensor is coupled to a measurement circuit 64. As described below, electrode 62 forms at least in part a capacitance to ground that is distributed in the space. Electrode 62 has capacitive coupling to ground through the surrounding objects that are galvanically or capacitively connected to ground. As an example and not by way of limitation, the capacitance to ground may include multiple elements, such as for example capacitance of the tracks in the silicon, tracks on the printed circuit board (PCB), electrodes 62 made from conductive material (ITO, copper mesh, etc.), or an object providing a touch or proximity input. As described above, measurement circuit 64 of the touch-sensor controller transmits a drive signal and senses a signal indicative of a touch or proximity input, from for example a portion of human hand 60, through electrode 62. In particular embodiments, measurement circuit 64 of the touch-sensor controller generates the drive signal transmitted by electrode 62 and senses the capacitance to ground. The capacitance of the surrounding material includes at least in part, the capacitance between electrode 62 and ground with the portion of human hand 60 providing the touch or proximity input. As an example and not by way of limitation, the capacitance provided by the portion of human hand 60 providing the touch or proximity input may add 5-10% of the capacitance sensed by electrode 62.

In the example of FIG. 4B, the drive signal transmitted by electrode 62 generates an electric field that emanates from electrode 24 to a signal ground of the touch sensor. The signal ground is galvanically or capacitively coupled to ground. The presence of the portion of human hand 60 affects the electric field and in turn the amount of charge sensed at electrode 62 by measurement circuit 64. As the portion of human hand 60 approaches electrode 62, the capacitance between electrode 62 and ground detected by the measurement circuit 64 increases. Although this disclosure describes the measurement circuit being integrated with a touch-sensor controller, this disclosure contemplates the measurement circuit being a discrete circuit or part of any suitable circuit.

In particular embodiments, the touch sensor may use both the drive and the sense electrodes 62 to sense signals from active stylus 20 or detect a proximity or touch input from the portion of human hand 60 in a self-capacitance operation. As example and not by way of limitation, the drive and the sense electrodes may be simultaneously scanned to sense signals. As another example, the drive and sense electrodes 62 may be sequentially scanned, such that for example the lines of drive electrodes may sense a first signal while the lines of sense electrodes wait, and then the lines of sense electrodes may sense a subsequent signal after the lines of drive electrodes 62 are finished.

In the example of FIG. 4C, active stylus 20 transmits generates an electric field that is detected by electrode 62 of the touch sensor. As described above, active stylus 20 may be configured to continuously transmit a signal that may be detected by electrode 62 of the touch sensor. As an example and not by way of limitation, active stylus 20 transmit a waveform such as a square wave or a sine wave, or a switch in active stylus 20 may toggle the potential of the conductive tip between zero voltage and a maximum voltage. The signal transmitted by active stylus 20 may be sensed by electrodes 62, as described below.

Figure 5:
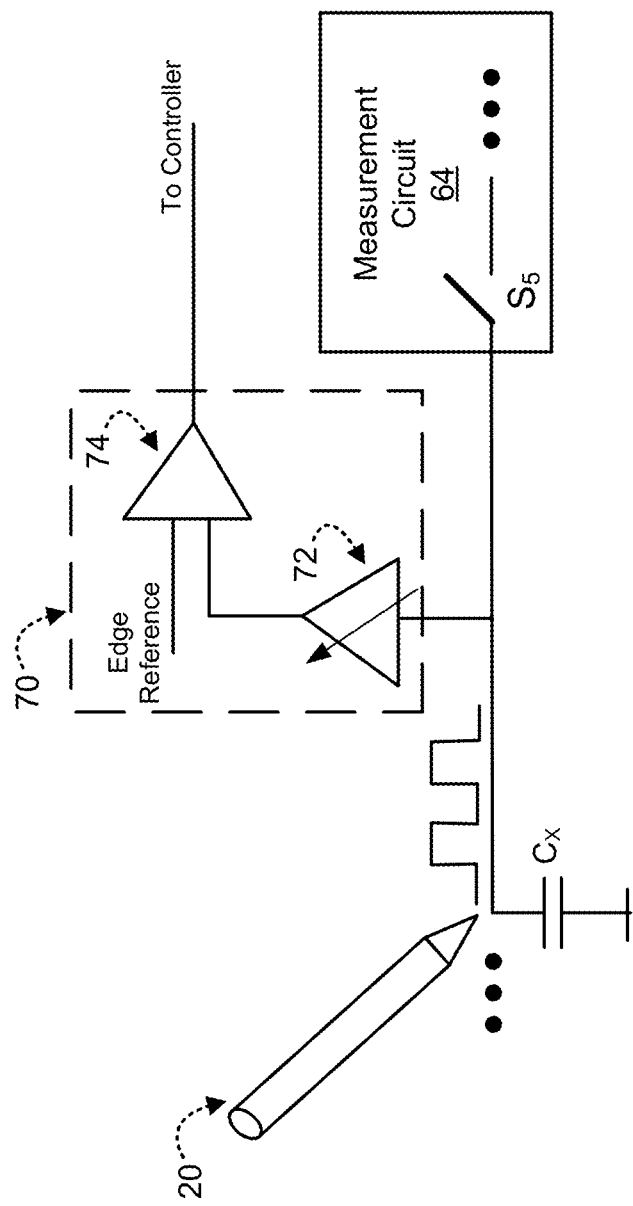
FIG. 5 illustrates an example circuit schematic for an example edge-detection circuit.

FIG. 5 illustrates an example circuit schematic for an example edge-detection circuit. As described above, measurement capacitance $C_X$ may be formed in part between an electrode of the touch sensor and other surrounding conductive material of the touch sensor (not shown) capacitively or galvanically coupled to ground. As an example and not by way of limitation, measurement capacitance $C_X$ may include some intrinsic capacitance associated with the design of the touch sensor. Measurement capacitance $C_X$ is coupled to measurement circuit 64 through switch $S_5$, as described below. In the example of FIG. 5, edge-detection circuit 70 includes an input to a current conveyor 72 coupled to measurement capacitance $C_X$ and an output of current conveyor 72 providing an input for comparator 74. Current conveyor 72 is a circuit designed to convey current between an input terminal and the output terminal at different impedance levels resulting in the output current of current conveyor being substantially proportional to the input current. In some embodiments, current conveyor 72 may be provided for low-impedance input.

Edge-detection circuit 70 may be locked to the frequency of the signal transmitted by active stylus 20 and use this lock to sample a maximum signal amplitude of the transmitted signal. Comparator 74 of edge-detection circuit 70 compares the output of current conveyor 72 to an edge reference provided to a second input of comparator 74. The output of comparator 74 changes state when the output from current conveyor 72 increases above or decreases below the edge reference provided to the second input of comparator 74. The change of state of the comparator 74 output may be an indication of an edge of the signal. In particular embodiments, the controller of the touch sensor receives the output of comparator 74 to detect the edges of the signal transmitted by active stylus 20 and lock on to the maximum of the transmitted signal. In particular embodiments, the touch-sensor controller may determine the frequency of the signal based at least in part on the signal from edge-detection circuit 70 corresponding to the detected edges. When the frequency of the signal transmitted by active stylus 20 is either constant or known, edge-detection circuit 70 may determine when the maximum of the transmitted signal occurs. In particular embodiments, locking edge-detection circuit 70 to the signal transmitted by active stylus 20 may simplify communication by using synchronous data transfer with substantially a 1:1 communication rate.

Figure 6:
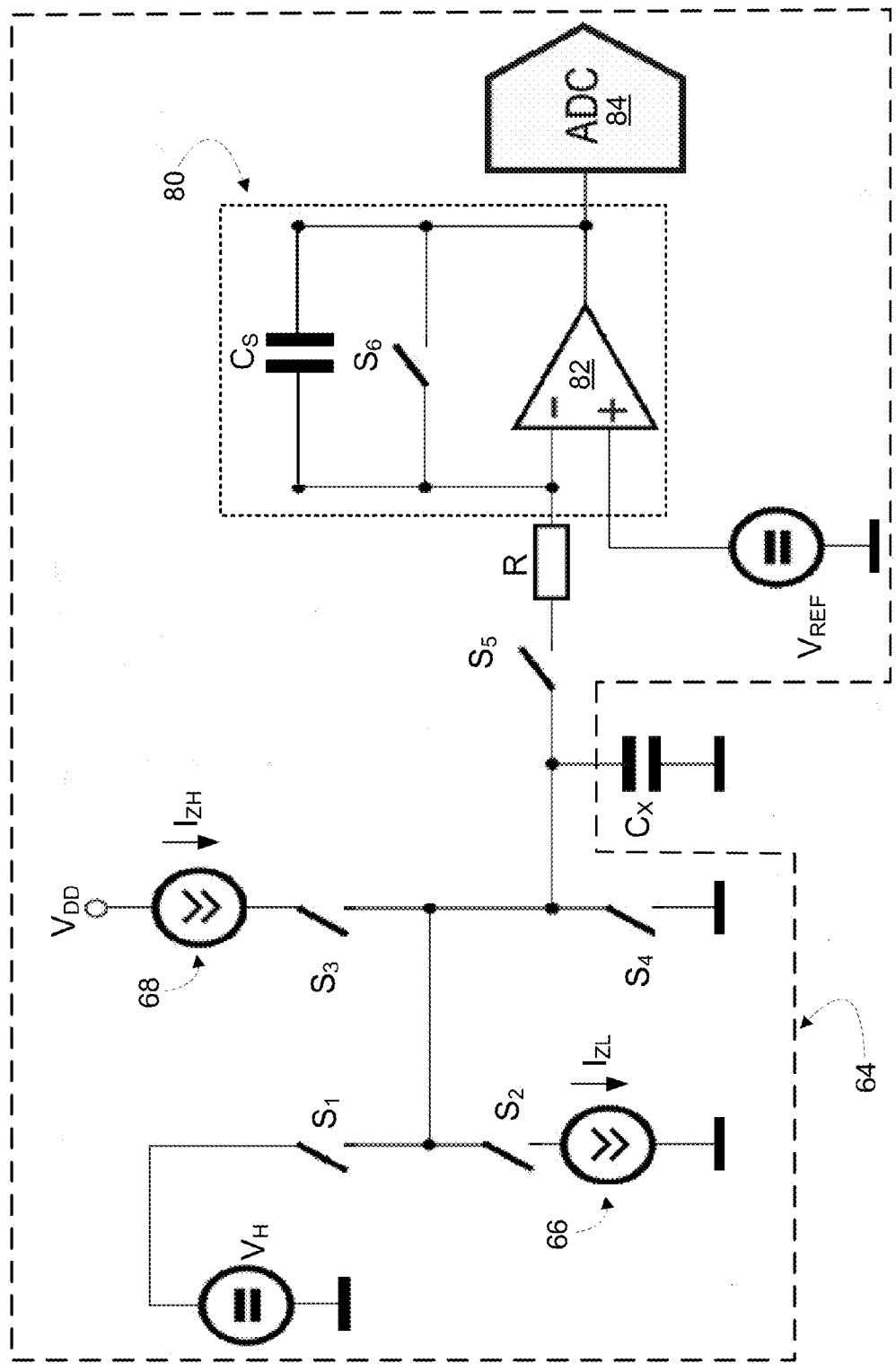
FIG. 6 illustrates an example schematic for an example measurement circuit.

FIG. 6 illustrates an example schematic for an example measurement circuit. Measurement circuit 64 determines a change of a touch sensor capacitance schematically illustrated in the example of FIG. 5 by measurement capacitance $C_X$. Measurement capacitance $C_X$ includes at least a portion of the electrode and is coupled to a voltage source $V_H$ or current source 66 through switches $S_1$ and $S_2$, respectively. Measurement capacitance $C_X$ is coupled to a second current source 68 or ground through switches $S_3$ and $S_4$, respectively. In particular embodiments, current source 66 and current source 68 are configured to generate currents $I_{ZL}$ and $I_{ZH}$, respectively. Switch $S_5$ couples measurement capacitance $C_X$ to an integrator circuit 80. In particular embodiments, measurement capacitance $C_X$ is coupled to integrator circuit 80 through a resistor R.

In particular embodiments, integrator circuit 80 includes op-amp 82 coupled to measurement capacitance $C_X$ through switch $S_5$. One terminal of a sampling capacitor $C_S$ is coupled to the negative input of op-amp 82 and the other terminal of sampling capacitor $C_S$ is coupled to the output of op-amp 82. Switch $S_6$ couples one terminal of sampling capacitor $C_S$ to the other terminal. In particular embodiments, a reference voltage $V_{REF}$ is coupled to the positive input of op-amp 82. The output of integrator circuit 80 is coupled to ADC 84. In particular embodiments, subtracting the subsequent measurement from the initial measurement may be performed in the analog domain or in the digital domain where the signals are measured and subtracted mathematically. Although this disclosure describes and illustrates a particular arrangement of particular components for the measurement circuit and integrator circuit, this disclosure contemplates any suitable arrangement of any suitable components for the measurement circuit and integrator circuit.

Figure 7:
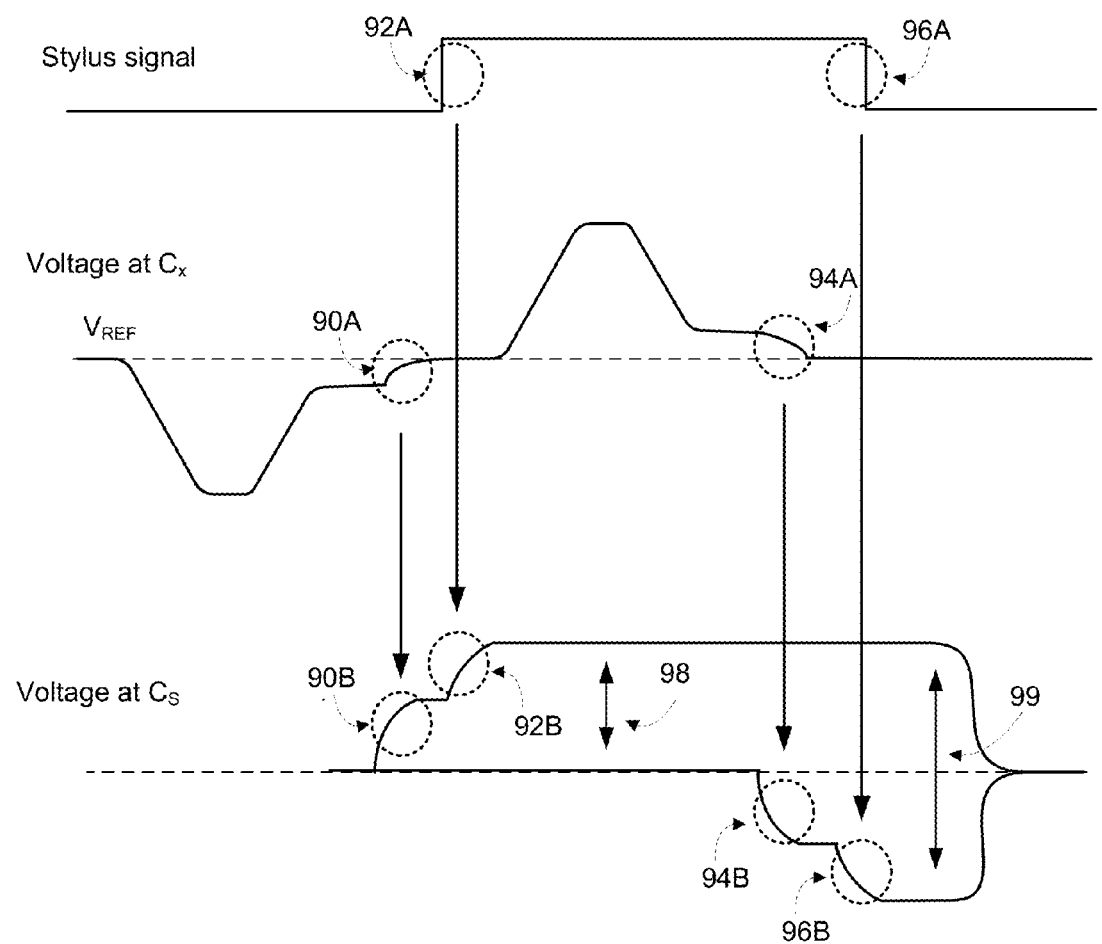
FIG. 7 illustrates an example measurement cycle for an example combination self-capacitance measurement.

FIG. 7 illustrates an example measurement cycle for an example combination self-capacitance measurement. As described above, a touch or proximity input on the electrode of the touch sensor affects the amount of charge, and in turn the voltage, at measurement capacitance $C_X$ formed at least in part from an electrode of the touch sensor. As described above, the self-capacitance portion of the measurement cycle applies a signal to measurement capacitance $C_X$ and determines the presence of the touch or proximity input based on the measured signal at measurement capacitance $C_X$. The modified amount of charge results in the voltage at measurement capacitance $C_X$ being a pre-determined voltage when switch $S_4$ is closed. As an example and not by way of limitation, the pre-determined voltage at measurement capacitance $C_X$ when switch $S_4$ is closed may be ground. After closing switch $S_4$, a pre-determined amount of charge is applied to measurement capacitance $C_X$ through a current source by opening switch $S_4$ and closing switch $S_3$. In particular embodiments, the pre-determined amount of charge applied through a current source with a pre-determined current $I_{ZH}$ and closing switch $S_3$ for a pre-determined amount of time. In the example of FIG. 7, the voltage at measurement capacitance $C_X$ after application of the pre-determined amount of charge is a voltage level that is lower than reference voltage level $V_{REF}$. As described above, the charging voltage level, i.e. the voltage at measurement capacitance $C_X$ after application of the pre-determined amount of charge, depends at least in part on the pre-determined amount of charge and whether a touch or proximity input occurs at the electrode of the touch sensor.

After the application of the pre-determined amount of charge, switch $S_5$ coupling measurement capacitance $C_x$ to the negative input of the op-amp is closed, thereby modifying the amount of charge of measurement capacitance $C_x$. As an example and not by way of limitation, the voltage at the negative terminal of the op-amp is set at reference voltage level $V_{REF}$. As described above, modification of the amount of charge of measurement capacitance $C_X$ modifies the voltage at measurement capacitance $C_X$ from the charging voltage level to reference voltage level $V_{REF}$, as illustrated by 90A. In particular embodiments, charge is transferred between measurement capacitance $C_X$ and sampling capacitor $C_S$ of the integrator circuit when switch $S_5$ is closed. The transferred charge is integrated by the integrator circuit until the voltage at measurement capacitance $C_X$ is substantially equal to reference voltage level $V_{REF}$. In particular embodiments, the integrator circuit measures the transferred amount of charge that modifies the voltage at measurement capacitance $C_x$ from the charging voltage level to reference voltage level $V_{REF}$. In particular embodiments, reference voltage level $V_{REF}$ is substantially equal to half a power supply voltage. The voltage at sampling capacitor $C_S$ varies by an amount proportional to the amount of transferred charge from the self-capacitance portion of the measurement, as illustrated by 90B.

As described above, an active stylus may combine with a portion of the human hand to provide a combination input. The active stylus may transmit a signal, such as for example a square wave, that may be detected by the electrode of the touch sensor. In the example of FIG. 7, the application of the pre-determined amount of charge to measurement capacitance $C_X$ is performed prior to receiving a first edge of the signal by the active stylus. As described above, the voltage at measurement capacitance $C_x$ is held at reference voltage level $V_{REF}$ by the negative terminal of the op-amp. Additional charge applied to measurement capacitance $C_x$ by the transmitted signal from the active stylus is transferred to sampling capacitor $C_S$ while a voltage is applied to measurement capacitance $C_x$. In particular embodiments, the rising edge of the transmitted signal applies a pre-determined amount of charge to sampling capacitor $C_S$ through measurement capacitance $C_x$.

As described above, the rising edge of the signal transmitted by the active stylus transfers a pre-determined amount of charge to sampling capacitor $C_S$ while measurement capacitance $C_x$ is held at reference voltage level $V_{REF}$. The integrator circuit measures the transferred amount of charge induced by the rising edge of the signal transmitted by the active stylus. The voltage at sampling capacitor $C_S$ varies by an amount proportional to the amount of charge transferred during the active stylus portion of the measurement, as illustrated by 92B. In particular embodiments, the integrator circuit integrates charge transferred from the charge applied to measurement capacitance $C_x$, as illustrated by 90A, and charge induced by the first edge of the signal from the active stylus, as illustrated by 92A. As an example and not by way of limitation, the charge transfer and integration is performed while switch $S_5$ is closed during 90A and 92A. In particular embodiments, a determination of whether a touch or stylus input to the touch sensor has occurred may be based at least in part on the voltage at sampling capacitor $C_S$ from the self-capacitance and active stylus portion of the measurement, as illustrated by 90B and 92B.

In particular embodiments, after the transfer of charge from the signal transmitted by the active stylus, the self-capacitance portion of the measurement resumes. The amount of charge of measurement capacitance $C_X$ is modified by closing switch $S_1$, resulting in the voltage at measurement capacitance $C_X$ being a pre-defined voltage. As an example and not by way of limitation, voltage is a power supply voltage of the touch sensor. A pre-determined amount of charge is applied to measurement capacitance $C_X$ through the electrode of the touch sensor by opening switch $S_1$ and closing switch $S_2$. As an example and not by way of limitation, a pre-determined amount of charge is generated by current source 66 configured to provide a current $I_{ZL}$ and closing switch $S_2$ for a pre-determined amount of time. In particular embodiments, the polarity of current $I_{ZH}$ is opposite the polarity of current $I_{ZL}$ relative to measurement capacitance $C_X$. In the example of FIG. 7, the voltage at measurement capacitance $C_X$ after application of the pre-determined amount of charge is a second charging voltage level that is higher than reference voltage level $V_{REF}$.

After the pre-determined time that current $I_{ZL}$ is applied to measurement capacitance $C_X$ has elapsed, switch $S_5$ coupling a electrode portion of measurement capacitance $C_X$ to the negative input of the op-amp is closed, thereby modifying the amount of charge of measurement capacitance $C_X$. Modification of the amount of charge of measurement capacitance $C_X$ modifies the voltage at measurement capacitance $C_X$ from the second charging voltage level to reference voltage level $V_{REF}$, as illustrated by 94A. As described above, charge is transferred between measurement capacitance $C_X$ and sampling capacitor $C_S$ of the integrator circuit. As an example and not by way of limitation, in the example of FIG. 7, the transfer of charge between measurement capacitance $C_X$ and sampling capacitor $C_S$ decreases the voltage at measurement capacitance $C_X$ from the second charging voltage level to reference voltage level $V_{REF}$, as illustrated by 94A.

In the example of FIG. 7, the second edge of the signal transmitted by the active stylus transfers a pre-determined amount of charge to sampling capacitor $C_S$ while the voltage at measurement capacitance $C_X$ is held at reference voltage level $V_{REF}$, as illustrated by 96A. In particular embodiments, the integrator circuit measures the transferred amount of charge induced by the second edge of the signal transmitted by the active stylus. The voltage at sampling capacitor $C_S$ varies by an amount proportional to the amount of transferred charge from the active stylus portion of the measurement, as illustrated by 96B. In particular embodiments, a determination of whether a touch or stylus input to the touch sensor has occurred may be based at least in part on the voltage at sampling capacitor $C_S$ from the self-capacitance and active stylus portion of the measurement, as illustrated by 90B and 94B, and 92B and 96B, respectively.

The voltage at sampling capacitor $C_S$ after the first application of charge to measurement capacitance $C_X$ by the measurement circuit, illustrated by 90B, and the voltage at sampling capacitor $C_S$ after receiving the first edge of the signal from the active stylus, illustrated by 92B have an opposite polarity to the voltage at sampling capacitor $C_S$ after the second application of charge to measurement capacitance $C_X$ by the measurement circuit, illustrated by 94B and the voltage at sampling capacitor $C_S$ after receiving the second edge of the signal from the active stylus, illustrated by 96B. As example and not by way of limitation, the voltage change at sampling capacitor $C_S$ after 90B and 92B is positive, i.e. the voltage at measurement capacitance $C_X$ is lower than reference voltage level $V_{REF}$ prior to the first application of charge by the measurement circuit. The voltage change at sampling capacitor $C_S$ after 94B and 96B is negative, i.e. at measurement capacitance $C_X$ is higher than reference voltage level $V_{REF}$ prior to the second application of charge by the measurement circuit. The voltage difference between the charging voltage levels at measurement capacitance $C_X$ after the application of charge by the measurement circuit is proportional to the difference between the pre-determined voltages and the reference voltage level $V_{REF}$ and the ratio between measurement capacitance $C_X$ and sampling capacitor $C_S$. Although this disclosure describes and illustrates particular differences between the various charging voltage levels relative to the reference voltage level, such as for example the first charging voltage level lower relative to the reference voltage, this disclosure contemplates any suitable difference between the charging voltage levels relative to the reference voltage level, including such as for example the first charging voltage level that is higher or substantially equal to the reference voltage. Moreover, this disclosure contemplates any suitable timing of the rising and falling edges of the active stylus signal relative to the charging and discharging of the measurement capacitance.

Determination of whether a proximity input from a portion of a human hand or an input from an active stylus has occurred is based at least in part on the voltage at sampling capacitor $C_S$. In particular embodiments, the voltage at sampling capacitor $C_S$ is measured and digitized through the ADC of the measurement circuit after an initial measurement, illustrated by 90B and 92B. The voltage difference 98 between the initial voltage at sampling capacitor $C_S$ and after the initial measurement may be compared to a calibration voltage level at sampling capacitor $C_S$ without a proximity input or active stylus input. A determination of whether a proximity input from the portion of the human hand or stylus occurred may be based at least in part on comparing voltage difference 98 to the voltage at sampling capacitor $C_S$. In particular embodiments, the voltage at sampling capacitor $C_S$ may be calibrated to determine one or more pre-determined threshold values corresponding to a proximity input or a proximity input and an active stylus input. As an example and not by way of limitation, a proximity input using a portion of a human hand may be determined to occur if a voltage difference 98 at sampling capacitor $C_S$ is higher than a pre-determined threshold value for the proximity input, but lower than the pre-determined threshold level for the proximity and active stylus input. As another example, a combination input using a portion of a human hand and an active stylus may be determined to occur if a voltage difference 98 at sampling capacitor $C_S$ is higher than the pre-determined threshold level for the proximity and active stylus input.

LF noise may corrupt the input detected through the electrode of the touch sensor. As an example and not by way of limitation, LF noise may originate from active main lines of the touch sensor operating at 50-60 Hz. As another example, LF noise may have a large amplitude, such as for example, of 100 volts or more. During a transfer of charge, a LF noise source may inject an amount of charge on measurement capacitance $C_X$. Depending on whether on the LF noise is positioned on the falling or rising slope of the LF input waveform, the injected charge adds or subtracts charge into measurement capacitance $C_X$ as an offset to the modification of charge of measurement capacitance $C_X$ performed by the measurement circuit. In the case when sequential measurements are performed, the charge added or subtracted by the LF noise source appears as common-mode shift of the signals from measurement capacitance $C_X$. Depending on the measurement frequency, the common-mode shift may modify the amplitude or polarity of signals from measurement capacitance $C_X$.

LF noise present at charging and discharging of measurement capacitance $C_X$ is observed as a common-mode offset in the signal of both applications of current. Common-mode offsets may have a frequency that is lower than a measurement frequency and cause signal fluctuation. For measurements performed within a relatively short period of time, the induced LF noise has substantially the same polarity and amplitude for each transfer of charge from measurement capacitance $C_X$ to sampling capacitor $C_S$, while the measured voltage changes at sampling capacitor $C_S$ during the same time periods have same amplitude but opposite polarity. Subtracting the signal acquired during the initial measurement, illustrated by 90B and 92B, from the signal acquired during the subsequent measurement, illustrated by 94B and 96B, substantially suppresses LF noise common to both signals and retains the measured signal. In particular embodiments, subtraction of the voltage at sampling capacitor $C_S$ may be performed in the analog domain or in the digital domain, where the signals are measured and subtracted mathematically. In particular embodiments, the initial and subsequent measurements of the voltage at sampling capacitor $C_S$ are measured and digitized through the ADC of the measurement circuit. As an example and not by way of limitation, the output of the ADC may be mathematically manipulated to subtract the measured signals, as illustrated by 98. In particular embodiments, the polarity of the signal of one of the measurements may be inverted at sampling capacitor $C_S$ in the analog domain prior to the subtraction of signals to avoid the cancellation of the measured signal.

A determination of whether a proximity input from the portion of the human hand or stylus occurred may be based at least in part on comparing voltage difference 99 to the voltage at sampling capacitor $C_S$. In the example of FIG. 7, voltage difference 99 is the voltage difference between the signal acquired during the initial measurement, illustrated by 90B and 92B, and the signal acquired during the subsequent measurement, illustrated by 94B and 96B. As described above, the voltage at sampling capacitor $C_S$ may be calibrated to determine one or more pre-determined threshold values corresponding to a proximity input or a proximity input and an active stylus input. As an example and not by way of limitation, a stylus input may be determined to occur if voltage difference 99 at sampling capacitor $C_S$ is higher than a pre-determined threshold value for the stylus input, but lower than the pre-determined threshold level for the proximity and active stylus input. As another example, a combination input using a portion of a human hand and an active stylus may be determined to occur if voltage difference 99 at sampling capacitor $C_S$ is higher than the pre-determined threshold level for the proximity and active stylus input. Although this disclosure describes determining whether various inputs occurred using particular threshold levels, this disclosure contemplates the determination of any suitable input through use of any suitable threshold levels or voltages.

Figure 8:
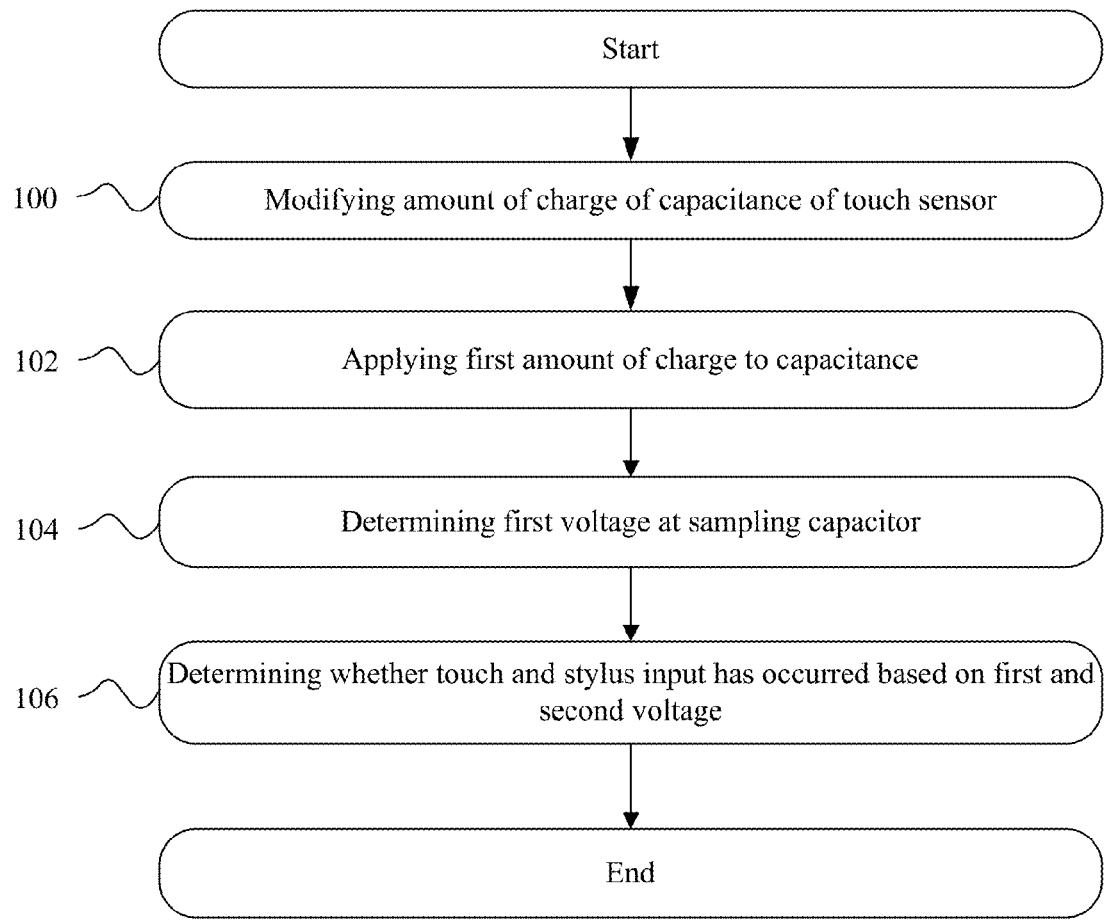
FIG. 8 illustrates an example method for combination self-capacitance measurements.

FIG. 8 illustrates an example method for combination self-capacitance measurements. The method may start at step 100, where an amount of charge of a capacitance of a touch sensor is modified. The modified amount of charge resulting in a voltage at the capacitance being a first pre-determined voltage level. In particular embodiments, the first pre-determined voltage is ground. Step 102 applies a first pre-determined amount of charge to the capacitance. The application of the first pre-determined amount of charge modifies the voltage at the capacitance from the first pre-determined voltage level to a first charging voltage level. In particular embodiments, the pre-determined amount of charge is generated by applying a pre-determined current to the capacitance for a pre-determined amount of time. In step 104, a first voltage at a sampling capacitor is determined. In particular embodiments, the first voltage is proportional to the difference between the first charging voltage level and a reference voltage level and reference voltage level is half a power supply voltage. At step 106, where whether a touch and stylus input to the touch sensor has occurred is determined based on the first voltage and a second voltage, at which point the method may end. In particular embodiments, the second voltage is proportional to a second pre-determined amount of charge applied to the sampling capacitor by a first edge of a signal transmitted a stylus. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates particular components carrying out particular steps of the method of FIG. 8, this disclosure contemplates any suitable combination of any suitable components carrying out any suitable steps of the method of FIG. 8.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    modifying an amount of charge of a capacitance of a touch sensor, the modified amount of charge resulting in a voltage at the capacitance being a first pre-determined voltage level;
    applying a first pre-determined amount of charge to the capacitance, the application of the first pre-determined amount of charge to the capacitance modifying the voltage at the capacitance from the first pre-determined voltage level to a first charging voltage level;
    determining a first voltage at a sampling capacitor, the first voltage being proportional to a difference between the first charging voltage level and a reference voltage level;
    applying, while holding the capacitance at the reference voltage level, a second pre-determined amount of charge to the capacitance by a first edge of a signal transmitted by a stylus, wherein applying the first predetermined amount of charge comprises applying a first amount of current to the capacitance prior to receiving the first edge of the signal transmitted by the stylus;
    determining a second voltage at the sampling capacitor, the second voltage being proportional to the second pre-determined amount of charge; and
    determining whether a touch and stylus input to the touch sensor has occurred based on the first voltage and the second voltage.

2. The method of claim 1, further comprising:
    modifying the amount of charge of the capacitance, the modified amount of charge resulting in the voltage at the capacitance being a second pre-determined voltage level;
    applying a third pre-determined amount of charge to the capacitance, the application of the third pre-determined amount of charge to the capacitance modifying the voltage at the capacitance from the second pre-determined voltage level to a second charging voltage level;

determining a third voltage at the sampling capacitor, the third voltage being proportional to a difference between the second charging voltage level and the reference voltage level;

applying a fourth pre-determined amount of charge to the capacitance by a second edge of a signal transmitted by the stylus; and determining whether a touch and stylus input to the touch sensor has occurred based on the first voltage, the second voltage, the third voltage, and a fourth voltage, the fourth voltage being proportional to the fourth pre-determined amount of charge.

3. The method of claim 2, wherein applying the third pre-determined amount of charge comprises applying a second amount of current to the capacitance prior to receiving the second edge, the second current having an inverse polarity than the first current relative to the capacitance.

4. The method of claim 2, further comprising:
inverting a sign of the third and fourth voltages; and
subtracting a sum of the first and second voltages from a sum of the third and fourth voltages, the subtraction substantially suppressing low-frequency noise in the first, second, third and fourth voltages.

5. The method of claim 1, wherein determining the first and second voltage comprises:
transferring the first pre-determined amount of charge to the sampling capacitor;
integrating the first pre-determined amount of charge transferred to the sampling capacitor;
transferring the second pre-determined amount of charge to the sampling capacitor; and
integrating the second pre-determined amount of charge transferred to the sampling capacitor.

6. The method of claim 1, further comprising:
detecting the first edge of the signal; and
determining a frequency of the signal based at least in part on the detection of the first edge.

7. The method of claim 6, wherein a timing of the application of the second pre-determined amount of charge and the determination of the first voltage is based at least in part on the determination of the frequency.

8. A computer-readable non-transitory storage medium embodying logic configured when executed to:
modify an amount of charge of a capacitance of a touch sensor, the modified amount of charge resulting in a voltage at the capacitance being a first pre-determined voltage level;
apply a first pre-determined amount of charge to the capacitance, the application of the first pre-determined amount of charge to the capacitance modifying the voltage at the capacitance from the first pre-determined voltage level to a first charging voltage level;
determine a first voltage at a sampling capacitor, the first voltage being proportional to a difference between the first charging voltage level and a reference voltage level;
apply, while holding the capacitance at the reference voltage level, a second pre-determined amount of charge to the capacitance by a first edge of a signal transmitted by a stylus, wherein applying the first predetermined amount of charge comprises applying a first amount of current to the capacitance prior to receiving the first edge of the signal transmitted by the stylus;

determine a second voltage at the sampling capacitor, the second voltage being proportional to the second pre-determined amount of charge; and
determine whether a touch and stylus input to the touch sensor has occurred based on the first and the second voltage.

9. The medium of claim 8, wherein the logic is further configured to:
modify the amount of charge of the capacitance, the modified amount of charge resulting in the voltage at the capacitance being a second pre-determined voltage level;
apply a third pre-determined amount of charge to the capacitance, the application of the third pre-determined amount of charge to the capacitance modifying the voltage at the capacitance from the second pre-determined voltage level to a second charging voltage level;
determine a third voltage at the sampling capacitor, the third voltage being proportional to a difference between the second charging voltage level and the reference voltage level;
apply a fourth pre-determined amount of charge to the capacitance by a second edge of a signal transmitted by the stylus; and
determine whether a touch and stylus input to the touch sensor has occurred based on the first voltage, the second voltage, the third voltage, and a fourth voltage, the fourth voltage being proportional to the fourth pre-determined amount of charge.

10. The medium of claim 9, wherein the logic is further configured to apply a second amount of current to the capacitance prior to receiving the second edge, the second current having an inverse polarity than the first current relative to the capacitance.

11. The medium of claim 9, wherein the logic is further configured to:
invert a sign of the third and fourth voltages; and
subtract a sum of the first and second voltages from a sum of the third and fourth voltages, the subtraction substantially suppressing low-frequency noise in the first, second, third and fourth voltages.

12. The medium of claim 8, wherein the logic is further configured to:
transferring the first pre-determined amount of charge to the sampling capacitor;
integrating the first pre-determined amount of charge transferred to the sampling capacitor;
transferring the second pre-determined amount of charge to the sampling capacitor; and
integrating the second pre-determined amount of charge transferred to the sampling capacitor.

13. The medium of claim 8, wherein the logic is further configured to:
detect the first edge of the signal; and
determine a frequency of the signal based at least in part on the detection of the first edge.

14. The medium of claim 13, wherein a timing of the application of the second pre-determined amount of charge and the determination of the first voltage is based at least in part on the determination of the frequency.

15. A device comprising:
a measurement circuit; and
a computer-readable non-transitory storage medium coupled to the measurement circuit and embodying logic configured when executed to:

modify an amount of charge of a capacitance of a touch sensor, the modified amount of charge resulting in a voltage at the capacitance being a first pre-determined voltage level;

apply a first pre-determined amount of charge to the capacitance, the application of the first pre-determined amount of charge to the capacitance modifying the voltage at the capacitance from the first pre-determined voltage level to a first charging voltage level;

determine a first voltage at a sampling capacitor, the first voltage being proportional to a difference between the first charging voltage level and a reference voltage level;

apply, while holding the capacitance at the reference voltage level, a second pre-determined amount of charge to the capacitance by a first edge of a signal transmitted by a stylus, wherein applying the first predetermined amount of charge comprises applying a first amount of current to the capacitance prior to receiving the first edge of the signal transmitted by the stylus;

determine a second voltage at the sampling capacitor, the second voltage being proportional to the second pre-determined amount of charge; and determine whether a touch and stylus input to the touch sensor has occurred based on the first and the second voltage.

16. The device of claim 15, wherein the logic is further configured to:

modify the amount of charge of the capacitance, the modified amount of charge resulting in the voltage at the capacitance being a second pre-determined voltage level;

apply a third pre-determined amount of charge to the capacitance, the application of the third pre-determined amount of charge to the capacitance modifying the voltage at the capacitance from the second pre-determined voltage level to a second charging voltage level;

determine a third voltage at the sampling capacitor, the third voltage being proportional to a difference between the second charging voltage level and the reference voltage level;

apply a fourth pre-determined amount of charge to the capacitance by a second edge of a signal transmitted by the stylus; and determine whether a touch and stylus input to the touch sensor has occurred based on the first voltage, the second voltage, the third voltage, and a fourth voltage, the fourth voltage being proportional to the fourth pre-determined amount of charge.

17. The device of claim 16, wherein the logic is further configured to apply a second amount of current to the capacitance prior to receiving the second edge, the second current having an inverse polarity than the first current relative to the capacitance.

18. The device of claim 16, wherein the logic is further configured to:

invert a sign of the third and fourth voltages; and subtract a sum of the first and second voltages from a sum of the third and fourth voltages, the subtraction substantially suppressing low-frequency noise in the first, second, third and fourth voltages.

19. The device of claim 15, wherein the logic is further configured to:

detect the first edge of the signal; and determine a frequency of the signal based at least in part on the detection of the first edge.

20. The device of claim 19, wherein a timing of the application of the second pre-determined amount of charge and the determination of the first voltage is based at least in part on the determination of the frequency.

* * * * *